United States Patent Office 3,141,894
Patented July 21, 1964

3,141,894
DERIVATIVES OF SUBSTITUTED COUMARIN
Ernest Eugène Gérard Billen, 373 Chaussee d'Alsemberg, Uccle, Brussels, Belgium, and Georges Louis Henri Mattens, 17 Place van Gehuchten, Jette, Brussels IX, Belgium
Filed Mar. 27, 1962, Ser. No. 182,744
Claims priority, application Belgium Sept. 19, 1961
2 Claims. (Cl. 260—343.2)

The present invention relates to new derivatives of substituted coumarin possessing remarkable anticoagulant properties. It also concerns pharmaceutical compositions containing doses of the said derivatives. Finally, the invention likewise concerns a process for preparing new derivatives of substituted coumarin and pharmaceutical compositions containing them.

It is known that various known derivatives of coumarin, such as 3,3'-methylenebis-4-hydroxydicoumarin, 3-ethylbenzyl-4-hydroxycoumarin, 3α-acetonylbenzyl-4-hydroxycoumarin, etc. possess a hypocoagulant activity. One of the most commonly used anticoagulant derivatives of coumarin is the sodium salt of 3α-acetonylbenzyl-4-hydroxycoumarin. This compound has, it is true, valuable anticoagulant properties, but it is desirable to have available a hypocoagulant agent with a more rapid and more stable action in human therapeutics.

The present invention concerns, as new chemical compounds, possessing an anticoagulant action on the blood, derivatives of substituted coumarin corresponding to the following formula:

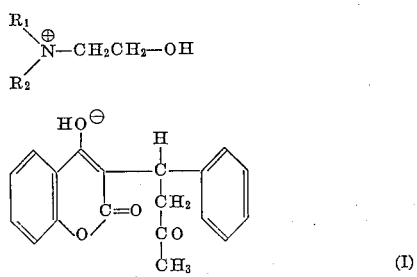

(I)

in which $R_1$ and $R_2$ are like or different alkyl radicals. In the case where $R_1$ and $R_2$ are, according to a preferred embodiment of the invention, a methyl radical, the new compound is the dimethylaminoethanol salt of 3α-acetonylbenzyl-4-hydroxycoumarin.

In vivo tests on animals have shown that this new compound possesses slight toxicity as well as a rapid and stable hypocoagulant power.

Thus, the acute toxicity ($DL_{100}$) in the guinea pig is 677 mg. per kg. and the lethal dose ($DL_{50}$) is 3.5 mg. per kg., while the acute toxicity of the sodium salt of 3α-acetonylbenzyl-4-hydroxycoumarin is 543 mg. per kg. (Knaffel Lents' method). The new compound thus shows acute toxicity definitely lower than that of the corresponding sodium salt.

As for the semichronic toxicity of the new dimethylaminoethanol salt of substituted hydroxycoumarin according to the invention, it corresponds practically to that of the corresponding sodium salt, as has been shown by tests carried out on rats.

Figure 1:
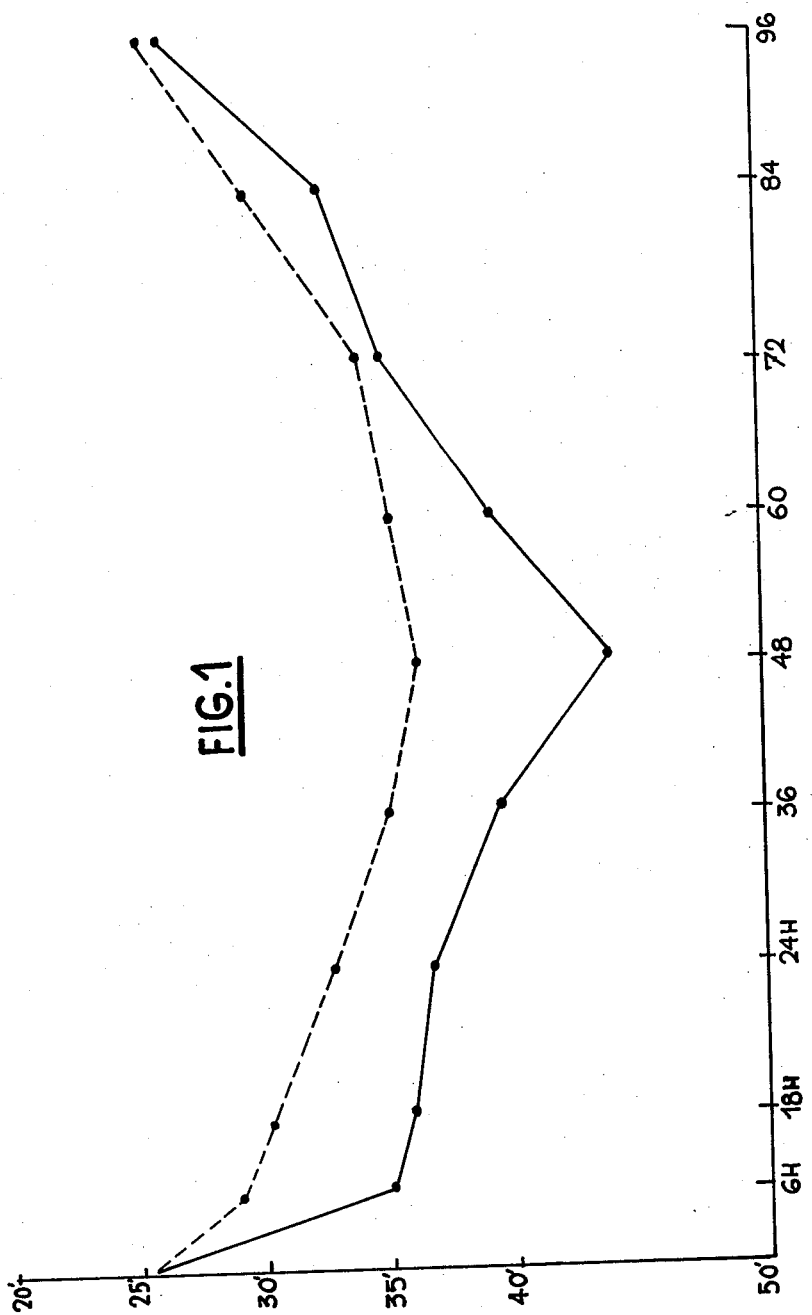

As regards the hyprocoagulant effect, tests on rabbits, to which have been administered a dose of 3 mg./kg. of the tested compounds intravenously, have shown that the hypocoagulant effect is very much more significant for the dimethylaminoethanol salt of 3α-acetonylbenzyl-4-hydroxycoumarin than for the corresponding sodium salt. FIGURE 1 of the annexed drawing shows the more marked hypocoagulant effect of the dimethylaminoethanol salt (curve in an unbroken line) with respect to the corresponding sodium salt (curve in a broken line). On the graph of FIGURE 1, mean coagulation times in minutes of the oxalated and recalcified blood plasma are given as ordinates, while the times at which the blood samples were taken, expressed in hours after intra-auricular injection of the tested compounds, are given as abscissae.

Tests on animals have likewise shown that the hypocoagulant action of the dimethylaminoethanol salt of 3α-acetonylbenzyl-4-hydroxycourmarin according to the invention is sufficiently rapid so that the use, during an attack treatment, of other anticoagulant agents having immediate action is superfluous.

Tests on animals, in particular on the white rat, have also shown that the dimethylaminoethanol salt of 3α-acetonylbenzyl-4-hydroxycoumarin according to the invention possesses a remarkably stable hypocoagulant action. This stability of action is much greater than that of the other known coumarin derivatives.

Figure 2:
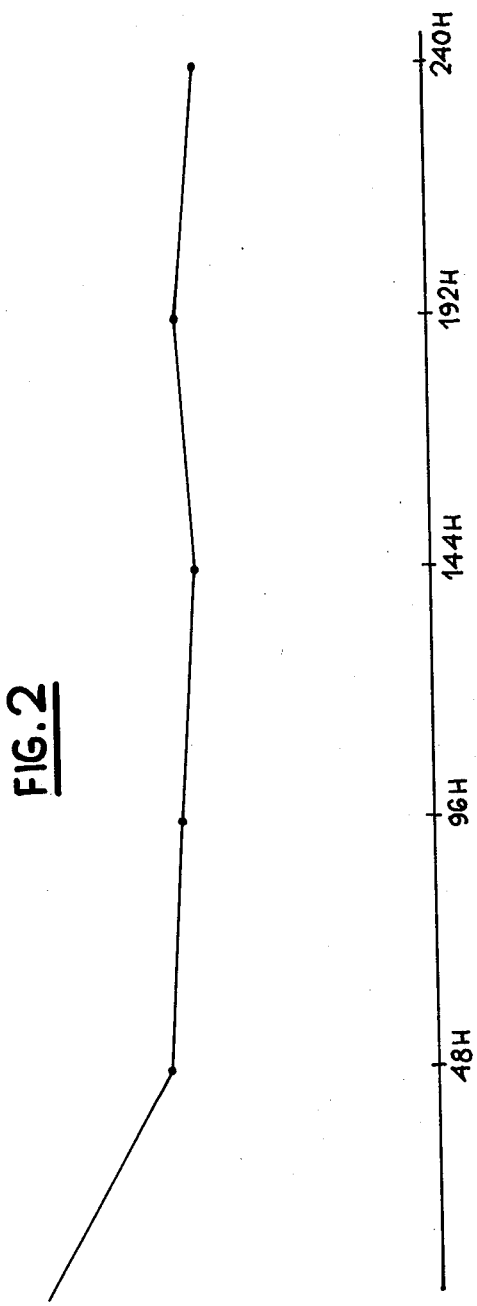

FIGURE 2 shows the remarkable stability of action of the new derivative of coumarin according to the invention. The curve of FIGURE 2 was obtained by administering a daily dose of 1.5 γ of the dimethylaminoethanol salt of 3α-acetonylbenzyl-4-hydroxycoumarin by gastric sound and in taking 4 cc. of blood 48, 92, 144, 192 and 240 hours after administration of the said salt.

Tests on animals have been confirmed by numerous clinical tests, which have shown the hypocoagulant activity, more rapid, more intense and, above all, more stable, of the dimethylaminoethanol salt of 3α-acetonylbenzyl-4-hydroxycoumarin according to the invention.

Figure 3:
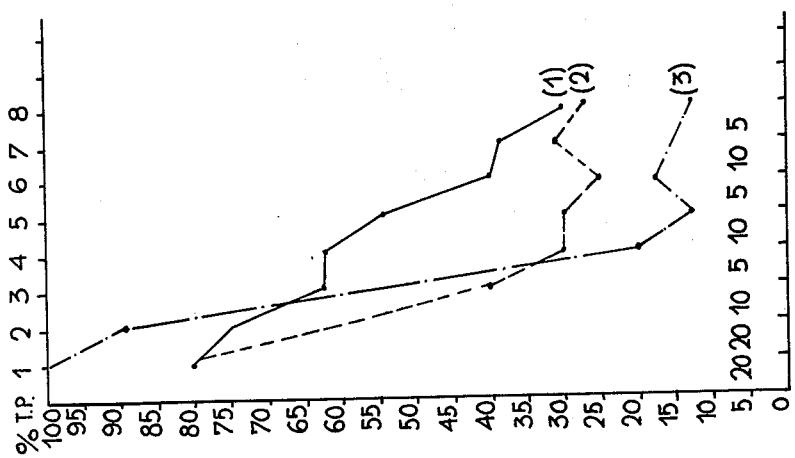

FIGURE 3 shows the comparative clinical effects of three hypocoagulant agents, namely the ethyl ester of 4,4'-dioxycoumarinylacetic acid (curve 1), the sodium salt of 3α-acetonylbenzyl-4-hydroxycoumarin (curve 2) and the dimethylaminoethanol salt of 3α-acetonylbenzyl-4-hydroxycoumarin according to the invention.

Figure 5:
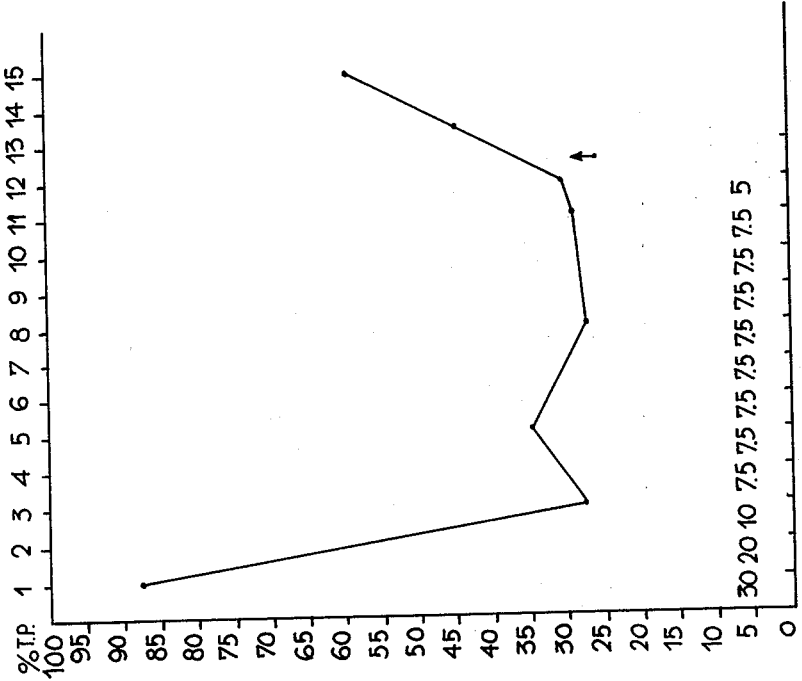
Figure 4:
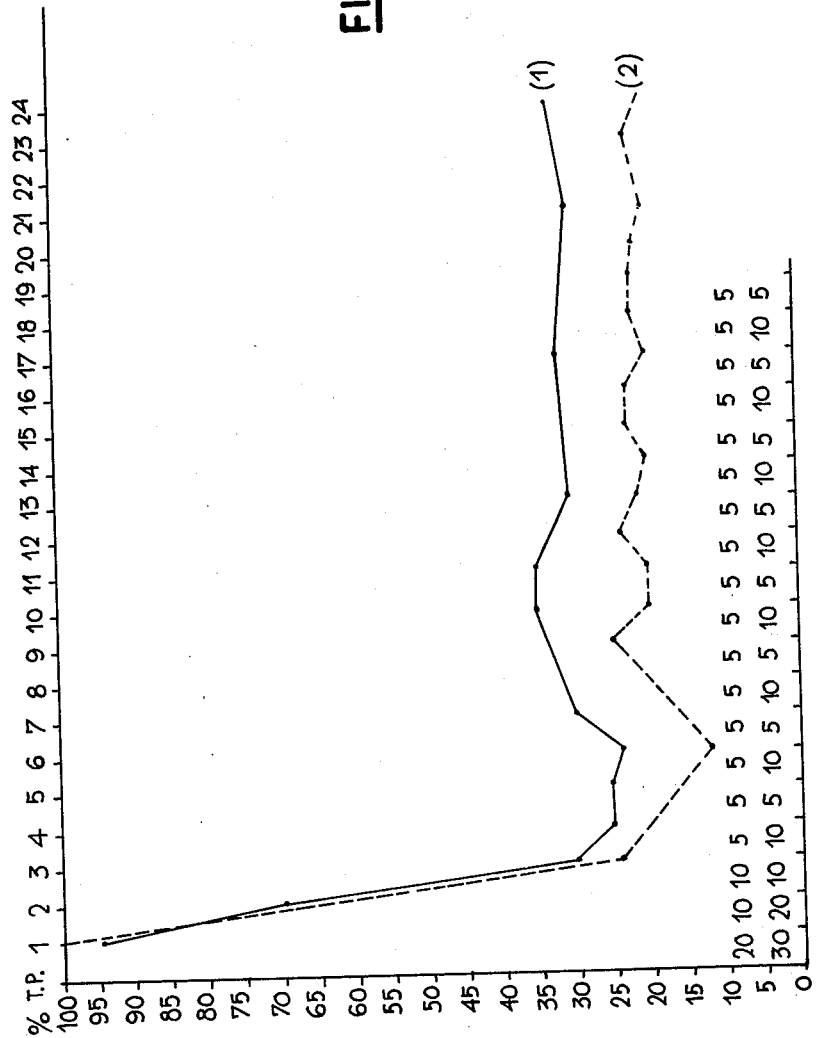

In FIGURE 3, as well as in FIGURES 4 and 5, amounts of prothrombin are given as ordinates and time in days as abscissae.

Examination of the curves of FIGURE 3 shows that, in the same patient, to which the three anticoagulant agents were administered, the following effects were shown:

(1) The hypocoagulant activity of the dimethylaminoethanol salt of 3α-acetonylbenzyl-4-hydroxycoumarin according to the invention is markedly more rapid than that of the two other known anticoagulant agents at equal daily doses of the three anticoagulant agents. These doses were 20, 20, 10, 5, 10, 5, 10 and 5 mg. per 24 hours;

(2) The hypocoagulant activity of the dimethylaminoethanol salt of 3α-acetonylbenzyl-4-hydroxycoumarin according to the invention, is more intense than that of the two known anticoagulant agents;

(3) Stabilization of the curve occurs, for the dimethylaminoethanol salt of 3α-acetonylbenzyl-4-hydroxycoumarin according to the invention, at an amount of blood prothrombin definitely lower than for the ethyl ether of 4,4'-dioxycoumarinylacetic acid and for the sodium salt of 3α-acetonylbenzyl-4-hydroxycoumarin.

FIGURE 4 shows the graph of the mean hypocoagulant action corresponding to 59 clinical cases of the dimethylaminoethanol salt of 3α-acetonylbenzyl-4-hydroxycoumarin.

Curve 1 refers to treatments in cases in which one endeavours to stabilize the curve of the amounts of prothrombin at about 30%.

Curve 2 refers to treatments in which one endeavours to stabilize the curve of the amounts of prothrombin at about 20%.

It may be stated that, with respect to preventive treatments as well as curative treatments, stabilization of the amounts of prothrombin in the blood takes place between the 36th and 60th hours after the beginning of treatment. Ultimately, when the maintenance dose has been determined, the amount of prothrombin is maintained in a remarkably stable way.

The daily doses in mg./24 hours are given for preventive treatments (1) and curative treatments (2) at the bottom of the graph of FIGURE 3.

FIGURE 5 reveals that the suppression (shown by an arrow on FIGURE 5) of the administration of the dimethylaminoethanol salt of 3α-acetonylbenzyl-4-hydroxycoumarin according to the invention, allows the amount of prothrombin to rise spontaneously, but there is no phenomenon of "rebound," that is to say no sudden increase of the amount of prothrombin above 100%, which is observed for many other anticoagulants, and which is clinically very dangerous, since this phenomenon, leading to a new period of hypercoagulability, can lead to new thrombosis and new embolisms.

Figure 6:
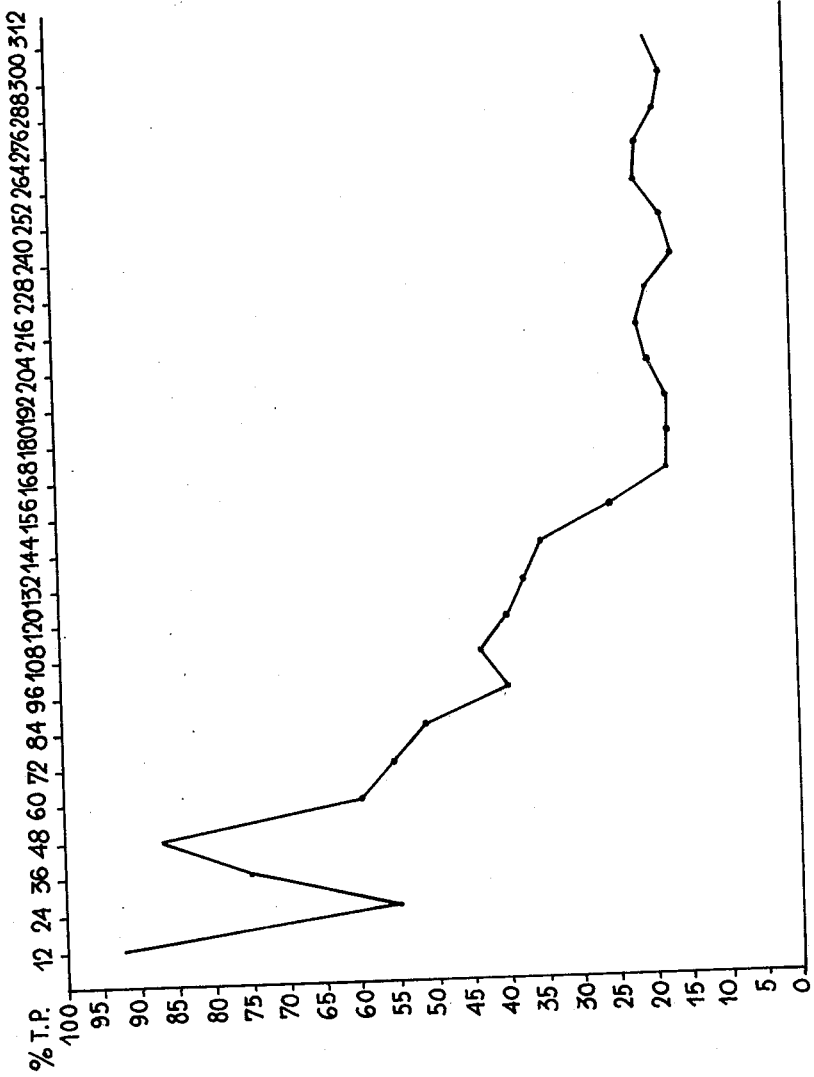

FIGURE 6, in which the amounts of prothrombin as percentages are given as ordinates and times in hours as abscissae, shows that there exists a cumulative effect of the dimethylaminoethanol salt of 3α-acetonylbenzyl-4-hydroxycoumarin according to the invention. Administration of a compound containing 10 mg. of the said hypocoagulant salt every 24 hours produces a progressive fall in the amount of prothrombin up to the 168th hour, that is the 7th day. There is a quasimathematical stabilization after this first period of treatment.

In conclusion, from a clinical point of view, based on the hypocoagulant action of the dimethylaminoethanol salt of 3α-acetonylbenzyl-4-hydroxycoumarin according to the invention, it may be stated that:

(1) The action is more rapid than that of other hypocoagulant compounds;

(2) The anticoagulant effect is more marked at an equivalent dose;

(3) The cumulative effect is produced only at the beginning of treatment, then the amount of prothrombin stabilizes;

(4) Stabilization is mathematically better than for other derivatives of coumarin having hypocoagulant action;

(5) In the case of the cessation of treatment, there is no sudden rise in the amount of prothrombin to dangerous figures (phenomenon of "rebound") as appears in the use of other anticoagulant products.

The present invention likewise concerns pharmaceutical compositions for the treatment and the prevention of thrombo-embolic affections, containing as active ingredient a dialkylaminoethanol salt of 3α-acetonylbenzyl-4-hydroxycoumarin, preferably the dimethylaminoethanol salt of that substituted coumarin. The therapeutic compositions according to the invention take the form, for preference, of solid compositions, administrable by the mouth or rectally, or in the form of solid compounds, administrable parenterally, for example intramuscularly, after dissolving or suspending in an injectable liquid vehicle. Hence, these compounds can take the form of tablets, granules, lozenges, pills and capsules, as well as in the form of suppositories containing a single dose of the dialkylaminoethanol salt of 3α-acetonylbenzyl-4-hydroxycoumarin, in mixture with the usual ingredients.

The proportions of active ingredients contained in the therapeutic compositions according to the present invention can vary within wide limits, for example between 500 γ and 10 mg. The therapeutic compounds according to the invention can take the form of divisible tablets containing, in addition to the usual excipients, such as lactose, magnesium stearate, starch, talc, calcium carbonate, sucrose, etc., 5 to 10 mg. of the dialkylaminoethanol salt, preferably the dimethylaminoethanol salt of 3α-acetonylbenzyl-4-hydroxycoumarin.

The present invention likewise relates to a process for preparing dialkylaminoethanol salts of 3α-acetonylbenzyl-4-hydroxycoumarin from a 3α-acetonylbenzyl-4-hydroxycoumarin of general formula:

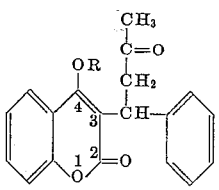

in which R denotes hydrogen or an atom of an alkali-metal, such as sodium, by substituting R by a hydrogen atom, in the case where R designates an atom of an alkali-metal, and by reaction with a dialkylaminoethanol, such as dimethylaminoethanol.

In the case where R denotes hydrogen, one causes 3α-acetonylbenzyl-4-hydroxycoumarin to react with a dialkylaminoethanol, for preference with dimethylaminoethanol, for example in an aqueous or alcoholic medium (methanol, ethanol, propanol, isopropanol), or in any other polar solvent.

In the case where R denotes an atom of an alkali-metal, such as sodium, one converts the alkali-metal salt of 3α-acetonylbenzyl-4-hydroxycoumarin to 3α-acetonylbenzyl-4-hydroxycoumarin by means of an acid, such as hydracid, such as hydrochloric acid, after which one causes the 3α-acetonylbenzyl-4-hydroxycoumarin thus obtained to react with dialkylaminoethanol, for preference with dimethylaminoethanol.

It is convenient to use, for the preparation of the new salts according to the invention, pure 3α-acetonylbenzyl-4-hydroxycoumarin. This compound should satisfy, for preference, the standards of purity of the American Pharmacopoeia U.S.P. XVI, page 797.

The pure 3α-acetonylbenzyl-4-hydroxycoumarin can be obtained starting with the sodium derivative (R=Na, Formula II) or starting with the acid (R=H, Formula II), found in commerce. Purification of these commercial compounds can be effected in the following way:

The sodium derivative is dissolved in ten times its volume of distilled water. The solution thus obtained is treated by means of a decolorizing agent, such as charcoal, until colourless, after which one precipitates the 3α-acetonylbenzyl-4-hydroxycoumarin by adding excess of an acid, such as hydrochloric acid, sulphuric acid or acetic acid. The precipitate is then filtered off, washed to complete elimination of the cation and of the anion of the acid used for precipitation. After drying one obtains the pure 3α-acetonylbenzyl-3-hydroxycoumarin.

When one starts with commercial 3α-acetonylbenzyl-4-hydroxycoumarin it can be purified by first converting the compound into an alkali-metal salt, such as the sodium salt, by the action of a base (caustic soda, caustic potash and the like) on 3α-acetonylbenzyl-4-hydroxycoumarin, in an aqueous medium. The alkali-metal salt thus obtained is then treated in the way described in the preceding paragraph.

The following non-limitative examples describe some forms of carrying out the process and therapeutic compositions according to the invention.

EXAMPLE I

*Preparation of the Dimethylaminoethanol Salt of 3α-Acetonylbenzyl-4-Hydroxycoumarin Starting With Sodium Salt of 3α-Acetonylbenzyl-4-Hydroxycoumarin.*

One dissolves 33 g. of the sodium salt of commerce of 3α-acetonylbenzyl-4-hydroxycoumarin in 330 ml. of distilled water. After adding 15 g. of absorbent charcoal, one filters. The filtrate obtained should be colourless after diluting with three times its volume of distilled water. Treatment by means of absorbent charcoal is repeated until a perfectly colourless solution is obtained.

The colourless solution is admixed with an excess of hydrochloric acid and agitated. The precipitate thus obtained is filtered off and washed with distilled water until the washings have a pH of 6 and are free from Cl ions. One then dries the precipitate at 105° C. to constant weight. One thus obtains pure 3α-acetonylbenzyl-4-hydroxycoumarin with a yield of more than 90%.

One dissolves 30.8 g. of pure 3α-acetonylbenzyl-4-hydroxycoumarin in 200 ml. of methanol. After adding 8.9 g. of pure dimethylaminoethanol, one heats the suspension on a water bath until completely dissolved. One then cools the solution, then filters it and concentrates it in vacuo at a low temperature to constant weight.

One thus obtains a yellowish viscous liquid, very soluble in water, and in methyl and ethyl alcohols and insoluble in ether and benzene. This viscouse liquid is the dimethylaminoethanol salt of 3α-acetonylbenzyl-4-hydroxycoumarin. The salt shows, in the U.V. spectrum, a minimum at 258–260 mμ and a maximum at 308 mμ. $E_{1\%}$—357 (at 308 mμ in 0.01 N NaOH).

EXAMPLE II

*Preparation of Dialkylaminoethanol Salts of 3α-Acetonylbenzyl-4-Hydroxycoumarin*

One operates as in Example I, except that one uses, in place of dimethylaminoethanol, another dialkylaminoethanol, such as diethylaminoethanol, dipropylaminoethanol, di-isopropylaminoethanol, di-s-butylaminoethanol or di-t-butylaminoethanol.

EXAMPLE III

*Preparation of the Dimethylaminoethanol Salt of 3α-Acetonylbenzyl-4-Hydroxycoumarin Salt Starting From Commercial 3α-Acetonylbenzyl-4-Hydroxycoumarin.*

One dissolves 30 g. of commercial 3α-acetonylbenzyl-4-hydroxycoumarin in 300 ml. of distilled water and one adds 4 g. of NaOH.

Then, operating in the way described in Example I, one obtains the dimethylaminoethanol salt of 3α-acetonylbenzyl-4-hydroxycoumarin with a yield of more than 90%.

EXAMPLE IV

*Tablets Containing the Dimethylaminoethanol Salt of 3α-Acetonylbenzyl-4-Hydroxycoumarin*

One prepares a base for tablets by mixing the following ingredients in the proportions by weight given as follows:

| | |
|---|---|
| Sucrose | 80 |
| Starch | 15 |
| Magnesium stearate | 5 |

With this base, one mixes a sufficient quantity of the diethylaminoethanol salt of 3α-acetonylbenzyl-4-hydroxycoumarin to form, by compression, divisible tablets each containing 10 mg. of active compound.

EXAMPLE V

*Lozenges Containing the Dimethylaminoethanol Salt of 3α-Acetonylbenzyl-4-Hydroxycoumarin*

One prepares the base mixture for lozenges containing the following ingredients:

| | Grams |
|---|---|
| Calcium carbonate | 15.6 |
| Dicalcium phosphate | 20.8 |
| Magnesium trisilicate | 5.4 |
| Lactose | 4.8 |
| Starch | 5.4 |
| Magnesium stearate | 2 |

With this lozenge base, one mixes a sufficient quantity of the dimethylaminoethanol salt of 3α-acetonylbenzyl-4-hydroxycoumarin to obtain lozenges each containing 5 mg. of active compound.

EXAMPLE VI

One places in dry ampoules 2 to 20 mg. of the dimethylaminoethanol salt of 3α-acetonylbenzyl-4-hydroxycoumarin. The ampoules are sealed in the usual way.

Each ampoule of hypocoagulant salt is accompanied by a sealed ampoule containing 2 ml. of distilled water.

At the time of use by intramuscular injection, one dissolves the contents of the ampoule of hypocoagulant salt in the distilled water.

It is obvious that the invention is not limited to the details given above and that modifications can be made without outside the scope of the invention as it is defined in the following claims.

What we claim is:

1. A dialkylaminoethanol salt of 3α-acetonylbenzyl-4-hydroxycoumarin of the following formula:

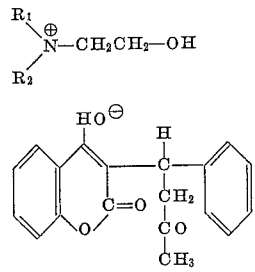

in which $R_1$ and $R_2$ are unsubstituted alkyl radicals containing 1 to 4 carbon atoms inclusive.

2. A salt according to claim 1, in which $R_1$ and $R_2$ are each the methyl radical.

References Cited in the file of this patent

UNITED STATES PATENTS

| | | |
|---|---|---|
| 2,449,038 | Hultquist | Sept. 7, 1948 |
| 2,601,204 | Campbell et al. | June 17, 1952 |
| 2,777,859 | Link | Jan. 15, 1957 |
| 2,932,652 | Molnar | Apr. 12, 1960 |